United States Patent
Wright et al.

(10) Patent No.: US 9,990,282 B2
(45) Date of Patent: Jun. 5, 2018

(54) ADDRESS SPACE EXPANDER FOR A PROCESSOR

(71) Applicant: Oracle International Corporation, Redwood City, CA (US)

(72) Inventors: Joseph Wright, Round Rock, TX (US); Erik Michael Schlanger, Austin, TX (US); Eric DeVolder, Cedar Park, TX (US)

(73) Assignee: Oracle International Corporation, Redwood City, CA (US)

( * ) Notice: Subject to any disclaimer, the term of this patent is extended or adjusted under 35 U.S.C. 154(b) by 97 days.

(21) Appl. No.: 15/140,333

(22) Filed: Apr. 27, 2016

(65) Prior Publication Data

US 2017/0315912 A1 Nov. 2, 2017

(51) Int. Cl.
*G06F 12/06* (2006.01)

(52) U.S. Cl.
CPC .. *G06F 12/0623* (2013.01); *G06F 2212/1041* (2013.01)

(58) Field of Classification Search
None
See application file for complete search history.

(56) References Cited

U.S. PATENT DOCUMENTS

| | | | |
|---|---|---|---|
| 4,796,177 A | 1/1989 | Nishimura et al. | |
| 4,805,092 A | 2/1989 | Cerutti | |
| 5,255,382 A | 10/1993 | Pawloski | |
| 5,715,419 A * | 2/1998 | Szczepanek | G06F 9/342 |
| | | | 711/212 |
| 6,088,780 A * | 7/2000 | Yamada | G06F 12/1009 |
| | | | 711/204 |
| 6,209,075 B1 | 3/2001 | Lau | |
| 6,349,380 B1 | 2/2002 | Shahidzadeh et al. | |
| 6,868,471 B1 * | 3/2005 | Kota | G06F 12/1483 |
| | | | 711/163 |
| 6,877,062 B2 | 4/2005 | Chen | |
| 7,013,362 B1 * | 3/2006 | Ervin | G06F 12/0623 |
| | | | 711/2 |
| 7,035,960 B2 | 4/2006 | Tu et al. | |
| 2010/0191913 A1 | 7/2010 | Chlipala et al. | |
| 2012/0198133 A1 | 8/2012 | Chou et al. | |
| 2015/0317089 A1 * | 11/2015 | Ho | G06F 12/0638 |
| | | | 711/102 |

OTHER PUBLICATIONS

Cisco, "Cisco Unified Computing System Extended Memory Technology Overview," downloaded from http://www.cisco.com/c/en/us/products/collateral/servers-unified-computing/ucs-b-series-blade-servers/white_paper_c11-525300.html, 2010 Cisco, pp. 1-2.
"Physical Address Extension," downloaded from https://msdn.microsoft.com/en-us/library/windows/desktop/aa366796%28v=vs.85%29.aspx on Mar. 21, 2016, 2016 Microsoft, pp. 1-5.

* cited by examiner

*Primary Examiner* — Kaushikkumar Patel
(74) *Attorney, Agent, or Firm* — Robert C. Kowert; Meyertons, Hood, Kivlin, Kowert & Goetzel

(57) ABSTRACT

An address range expander associated with a processor and a physical memory device determines that address transformation has been enabled with respect to an address indicated on the processor's address bus. The expander generates, using one or more address expansion parameter registers, a transformed address corresponding to the untransformed address within an address range of the physical memory device, and transmits the transformed address to a controller of the physical memory device.

15 Claims, 9 Drawing Sheets

Segregated register mode

Shared register mode

ADDRESS SPACE EXPANDER FOR A PROCESSOR

BACKGROUND

Many modern computing applications are run at execution platforms employing inexpensive and low-power system-on-chip (SOC) architectures. In an SOC architecture, a number of electronic components including a primary processor or CPU, one or more physical memory devices, graphic processors, audio-visual components and the like are implemented on a single chip substrate. In many cases, the developers of a particular SOC implementation may obtain the primary processor from a third party vendor which specializes in processor design.

For any given processor, the maximum address space (e.g., a 32-bit address space, which corresponds to four gigabytes of addressable memory), which is selected by the processor designers, impacts multiple portions of the design of internal subcomponents of the processor. For example, the design of the instruction and data caches of the processors as well as the memory management unit may be closely tied to the address space limit selected.

In some cases a processor may be used in an SOC which incorporates one or more physical memory devices with larger address spaces than that of the processor itself. For example, it may be possible to include a dynamic random access memory (DRAM) device with a 36-bit address space or a 40-bit address space in an SOC with a processor having a 32-bit address space. For some types of applications, it may be desirable from the perspective of the SOC designers to enable the processor to utilize such larger address ranges. Unfortunately, in many cases, the choices available to such SOC designers may be limited. Given cost and power-related constraints, the SOC designers may not necessarily be able to choose a different processor with a larger address range. Modifying the internal subcomponents of the processor itself to support the memory's address range may be a large and expensive undertaking. Redesigning and re-implementing the processor caches and memory management unit may require substantial design and verification effort, and may also reduce the area available for other SOC components on the chip. In some cases modifying the internal subcomponents of the processor may not even be feasible in view of contractual obligations with the processor vendor. At least some applications which are capable of benefiting from the larger address range of a memory devices of an SOC, but are restricted to utilizing the address range of the processor on the SOC, may exhibit sub-optimal performance.

SUMMARY

Various embodiments of systems, apparatus and methods for expanding the address range of a processor are disclosed. According to one embodiment, a system comprises one or more processors including a first processor, a memory device and one or more address range expanders, including a first address range expander coupled to the processor and the memory device. The first processor may have an address range expressible using a first number of bits, and the memory device may have a larger address range expressible using a larger number of bits. The first address range expander may be configured to determine that address transformation has been enabled with respect to an untransformed address indicated on an address bus of the first processor, where the untransformed address comprises the first number of bits. The first address range expander may generate, using one or more address expansion parameter registers, a transformed address corresponding to the untransformed address. The transformed address may lie within the larger address range of the physical memory device, and may in some cases lie outside the address range of the first processor itself. The first address range expander may transmit the transformed address to a controller of the physical memory device to initiate an operation associated with the transformed address. In some embodiments, a system may comprise several different processors, each of which has a respective address range expander. In one such embodiment, the physical memory device may be subdivided into several partitions, with each partition being used for code (e.g., boot code and/or application code) of a respective processor. The address range expander for a given processor may transform addresses (e.g., the starting address at which boot code is stored) emitted by the processor into addresses in the appropriate partition of the physical memory device.

In at least some embodiments an address range expander may comprise one or more address transformers. Individual ones of the address transformers may be associated with respective expansion parameter registers. To form at least a portion of a transformed address corresponding to an untransformed address indicated on a processor's address bus, the address range expander may select output generated from a particular one of the address transformers.

In various embodiments, respective bit sub-sequences of an expansion parameter register may govern whether and how a particular address indicated on the address bus of a processor is to be transformed. For example, in one embodiment an expansion parameter register may comprise a set of bits indicating a processor-side base address prefix. When determining whether a particular address emitted by a processor is to be transformed, the address transformer corresponding to the expansion parameter register may verify that the processor-side base address prefix matches corresponding bits of the untransformed address indicated on the address bus by the processor. In some embodiments, another set of bits of an expansion parameter register may indicate a base memory-device-side address prefix. A transformed address may be generated from an untransformed address based at least in part on the base memory-device-side address prefix and an offset indicated in the untransformed address in such an embodiment.

In one embodiment, a set of bits of an expansion parameter register may comprise an indication or encoding of a memory window size. Before transforming a particular address indicated on a processor's address bus, an address transformer may verify that the particular address lies within a range corresponding to the memory window size. For example, in one implementation a bit sequence of "010" at a particular offset within an expansion parameter register may indicate a memory window size of one gigabyte, while a sequence of "001" at that offset may indicate a memory window size of 512 megabytes. If a memory window size of 512 megabytes is set, and the untransformed address on the address bus lies outside the range which starts at the smallest address beginning with the processor-side base address prefix, and ends at that smallest address plus 512 megabytes, the untransformed address may not be modified by the address range expander. In at least some embodiments, one or more bits of an expansion parameter register may be used to indicate whether address translation using that register is currently enabled or not.

In some embodiments in which multiple address transformers associated with respective expansion parameter registers are implemented, a respective priority may be associated with each address transformer. In the event that the parameters indicated in two or more different expansion parameter registers clash or overlap (e.g., if the processor-side base address prefix of one register matches that of another, or if the memory-device-side base address prefix of one register matches that of another), the output produced by the address transformer with the highest priority among the associated address transformers may be used to generate the transformed address. In other embodiments in which multiple address transformers are implemented, an error signal (e.g., an interrupt) may be generated if the parameters in two or more expansion parameter registers clash or overlap.

The address range expansion technique outlined above may be used in the context of a wide variety of memory device types, processor types, and register designs in different embodiments. For example, the memory device types may include any of a variety of dynamic RAM devices (including double data rate synchronous dynamic RAM or DDR SDRAM) and/or static RAM devices. Processors implementing any of a variety of instruction set architectures may benefit from the address range expansion techniques in different embodiments. In at least one embodiment, the expansion parameter registers may be accessible from the processor via a different data bus than is used to transfer data to/from the physical memory device. In one embodiment, the expansion parameter registers may form part of a non-cacheable peripheral address range of the processor.

According to one embodiment, a method may comprise determining, at an address expander circuit coupled to a processor's address bus, that address transformation has been enabled with respect to an untransformed address indicated on the address bus. The address expander circuit may be located external to the processor itself; for example, it may be positioned between the processor and a physical memory device. The method may include generating, by the address expander circuit, a transformed address corresponding to the untransformed address. The transformed address may lie within an address range of the physical memory device, which may exceed the address range of the processor. The method may include transmitting, by the address expander circuit, the transformed address to a memory controller of the physical memory device to initiate an operation on data stored at the transformed address.

According to another embodiment, an address range expander may comprise a processor-side interface configured to couple to an address bus of a processor, one or more address transformers, and a memory-device-side interface configured to couple to a physical memory device. A particular address transformer of the address range expander may be configured to determine that address transformation has been enabled with respect to an untransformed address indicated by the processor-side interface. The untransformed address may comprise a first number of bits corresponding to an address range of the processor. The particular address transformer may generate a transformed address corresponding to the untransformed address. The transformed address may lie within an address range of the physical memory device, which may be larger than the address range of the processor. The address range expander may transmit the transformed address to the physical memory device via the memory-device-side interface to initiate an operation on data stored at the transformed address.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION OF EMBODIMENTS

Figure 1:
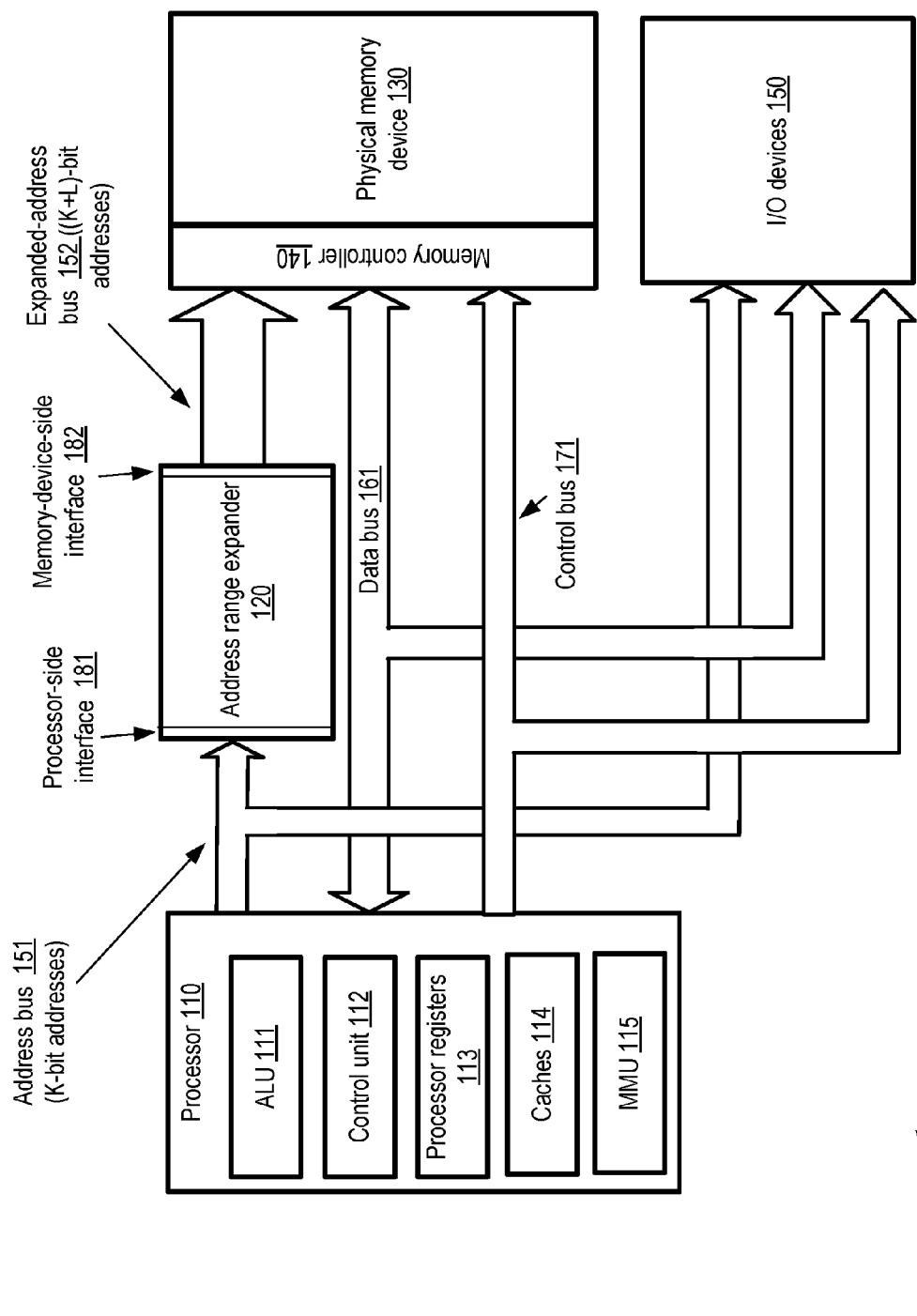
FIG. 1 illustrates an example system environment in which an address range expander may be implemented for a processor, according to at least some embodiments.

FIG. 1 illustrates an example system environment in which an address range expander may be implemented for a processor, according to at least some embodiments. As shown, system 100 comprises a processor 110, a physical memory device 130 with an associated memory controller 140, a set of input/output (I/O) devices 150 and an address range expander 120. In at least some embodiments, the various components shown in FIG. 1 may be incorporated within a single chip. The processor 110 may comprise a number of subcomponents including, for example, an arithmetic-logical unit (ALU) 111, a control unit 112, processor registers 113, one or more caches 114 and a memory management unit (MMU) 115 in the depicted embodiment. The processor 110 may implement any of a number of different instruction set architectures in various embodiments. The processor 110, physical memory device 130 and I/O devices 150 may be connected to one another via a collection of buses. For example, the processor 110 may place K-bit addresses on address bus 151 to indicate locations within physical memory device 130 or I/O devices 150 at which operations are to be performed. Data bus 161 may be used to transfer data items at the indicated addresses to or from the processor 110, and control bus 171 may be used by the processor to indicate the kinds of operations to be performed. It is noted that FIG. 1 represents a simplified or conceptual view of the high-level components which may be involved in address range expansion; in various embodiments, for example, multiple address buses (e.g., one for the physical memory and one for the I/O devices) may be employed, multiple data buses may be used, and so on.

In various embodiments, the address range expander circuitry may comprise several subcomponents, including a processor-side interface 181, a memory-device-side interface 182 as well as one or more address transformers (not shown in FIG. 1). The processor-side interface 181 may obtain K-bit addresses from the processor-side address bus 151. Depending on the settings of a group of expansion parameters (which may for example be stored in a set of registers as discussed below in further detail), the address range expander 120 may determine whether a particular K-bit address indicated on the address bus 151 is to be transformed or not. If a determination is made that the address is to be transformed, a modified address may be generated at the address range expander 120 and transmitted (using memory-device-side interface 182) via expanded address bus 152 to memory controller 140. In the depicted embodiment, the transformed address may comprise (K+L) bits, and as a result it may become possible for the processor to access data from a larger address range than the processor's native or internal K-bit address range. If a determination is made that a given processor-generated address is not to be transformed, that address may be placed on the expanded address bus 152 without modification in the depicted embodiment.

In various embodiments, the expansion parameters which govern the operations of the address range expander may include, among others, transformation enable/disable flags, processor-side base address prefixes, memory-device-side base address prefixes, memory window sizes, and the like. Further details regarding the manner in which the parameters may be expressed and/or programmatically modified in different embodiments are provided below. An enable/disable flag may be used to control whether address transformation is to be attempted, or whether the K-bit address generated by the processor is to be transmitted without modification to the memory controller. The specific ranges of processor-side addresses (e.g., the K-bit addresses of FIG. 1) which are to be mapped or transformed may be indicated by the combination of the processor-side base address prefixes and a corresponding memory window size. The target addresses to which the addresses are to be mapped within the memory device's address range may be indicated by a memory-device-side base address prefix parameter in at least some embodiments.

As indicated in FIG. 1, the address range expander circuitry may be located external to the processor, and may not require any modifications to internal processor subcomponents such as caches 114, MMU 115 and the like. The data bus 161 and the control bus 171 may also not be affected by the presence or absence of the address range expander circuitry. From the perspective of the processor and its subcomponents, memory addresses may continue to be expressed in K bits, independently of whether an address range expander is being utilized or not. As a result of the transparency of the address range expander design to the processor, it may be possible for designers of system 100 to utilize commodity or third-party processors 110 without alterations to the processors themselves.

Figure 2:
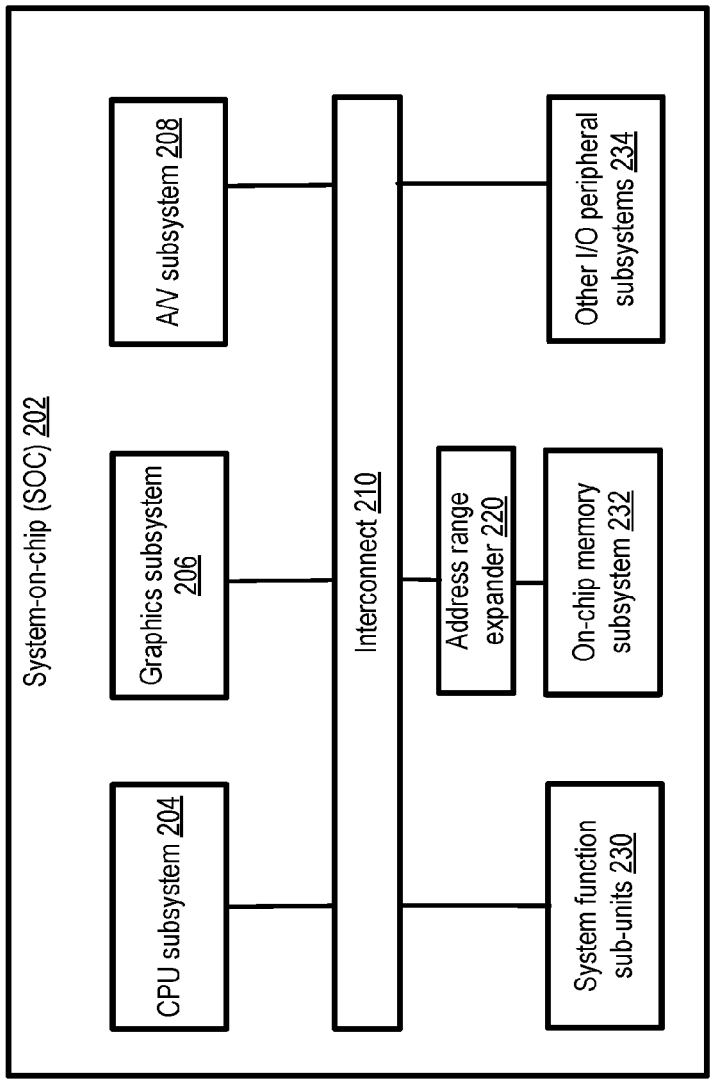
FIG. 2 illustrates an example of a system-on-chip (SOC) implementation which may include at least one address range expander, according to at least some embodiments.

In some embodiments, the address range expansion approach indicated in FIG. 1 may be employed for applications utilizing system-on-chip implementations. FIG. 2 illustrates an example of a system-on-chip (SOC) implementation which may include at least one address range expander, according to at least some embodiments. In the embodiment shown in FIG. 2, system-on-chip (SOC) 202 includes a CPU subsystem 204, a graphics subsystem 206 (e.g., including one or more GPUs or graphics processing units), an audio/visual (A/V) subsystem 208, system function sub-units 230 (e.g., timers, power controllers, etc.), on-chip memory subsystem 232, and one or more other I/O peripheral subsystems 234. These subsystems are linked to one another via on-chip interconnect 210, which in turn may comprise several buses or other lower-level interconnects.

The CPU subsystem 204 may comprise one or more processors or cores in the depicted embodiment. The address range accessible from a given processor of CPU subsystem 204 may in some cases be smaller than the address range of one or more memory devices of on-chip memory subsystem 232. An address range expander 220 may provide programmable mappings between the addresses indicated by one or more of the processors and addresses within the on-chip memory subsystem 232, thereby increasing the range of memory addresses which can be accessed beyond the native memory range supported by the processors. As discussed in the context of FIG. 1, a number of parameters which may be set via software and/or firmware may be used for generating the mappings.

SOCs designed for various applications may differ in at least some subcomponents, or in their overall layout, from the example illustrated in FIG. 2, but may still utilize one or more address range expanders. In at least some embodiments in which a CPU subsystem 204 comprises multiple processors or cores, respective address range expanders 220 may be implemented for each processor or core. In one embodiment, an address range expander 220 may be implemented as a subcomponent of the on-chip interconnect 210 and/or the on-chip memory subsystem 232. In some embodiments, the on-chip memory subsystem 232 may itself comprise several different physical memory devices, and a respective address range expander may be implemented for more than one of the physical memory devices. It is noted that address range expanders 220 of the kind described herein, which do not require modifications to the primary processors or processing cores of the system, may not require an SOC implementation—that is, such expanders may be utilized in systems whose subunits are distributed among several different chips in at least some embodiments.

Figure 3:
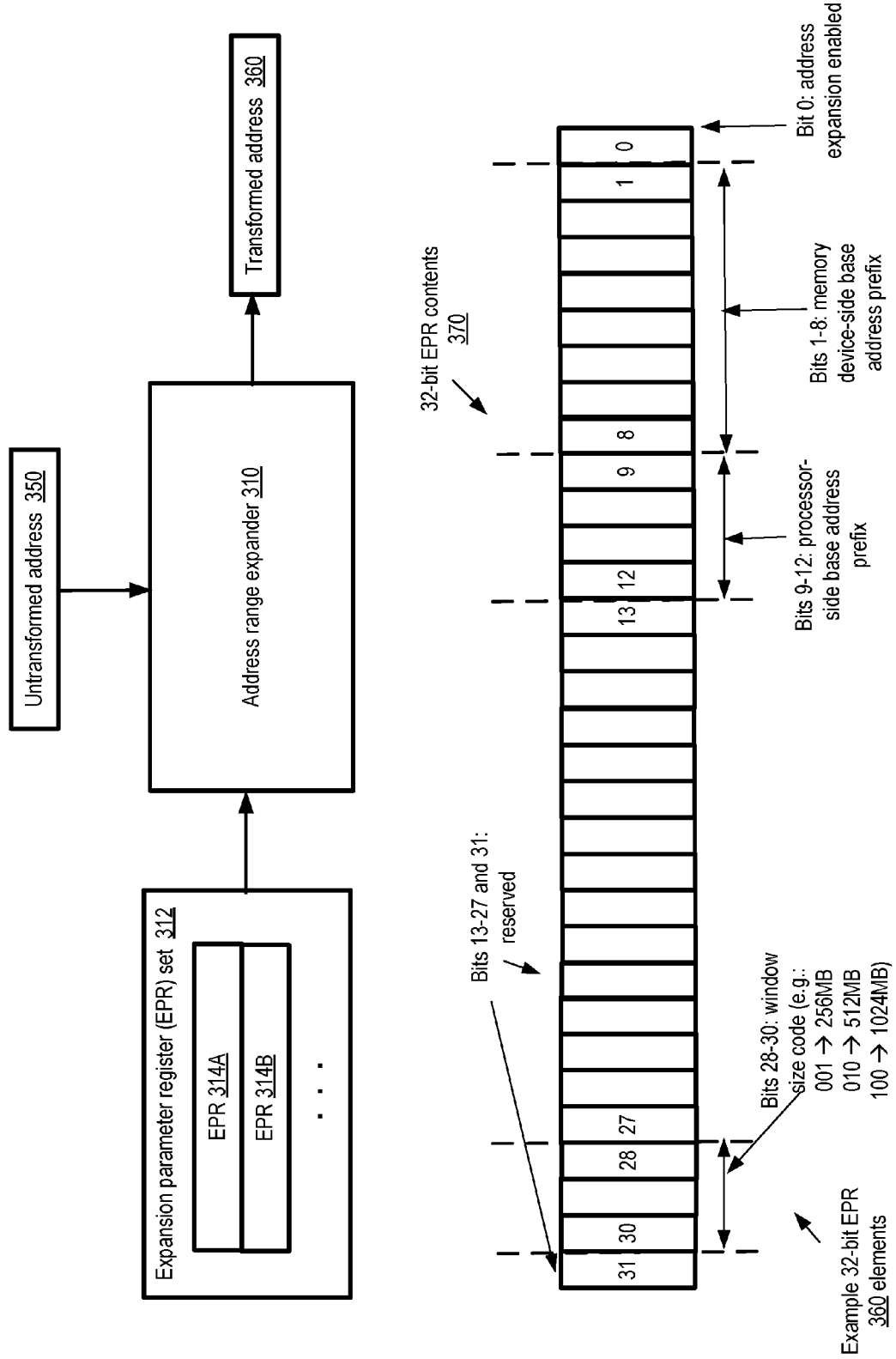
FIG. 3 illustrates example contents of expansion parameter registers which may be utilized for address range expansion, according to at least some embodiments.

FIG. 3 illustrates example contents of expansion parameter registers which may be utilized for address range expansion, according to at least some embodiments. In the depicted embodiment, an expansion parameter register (EPR) set 312 may comprise a plurality of EPRs such as EPR 314A and 314B, although some embodiments may include only one EPR. Contents of one or more EPRs 314 may be utilized to map an untransformed address 350 (e.g., an address detected on an address bus by expander 310's processor-side interface) into a transformed address 360 according to the parameter representation scheme shown.

In the depicted example, each EPR 314 may comprise 32 bits. In other embodiments, registers of any desired bit-width may be employed. The least significant bit (bit 0) is shown at the right in the EPR bit contents 370, and the most significant bit (bit 31) is shown at the left. Bit 0 may serve as an enable/disable flag. If bit 0 is set to 0, the remainder of the contents of the EPR may be ignored and address transformation may not be attempted based on the parameters indicated in the EPR. If bit 0 is set to 1, in contrast, the address range expander may initiate further operations to check whether the untransformed address meets the criteria indicated in the other parameters of the EPR, and to perform a transformation if the criteria are met.

Two base address prefixes for the address transformation are indicated in EPR bit contents 370. A four-bit processor-side base address prefix is indicated in bits 9-12, and an eight-bit memory-device-side base address prefix is indicated in bits 1-8. The number of bits used for the base address prefixes (at the processor-side, the memory-device-side, or both sides) may differ from the number of bits shown for illustrative purposes in FIG. 3 in different embodiments. In order to trigger a transformation (assuming bit 0 is set to 1), the four most-significant bits of an untransformed address 350 may have to match the processor-side base address prefix in the embodiment illustrated in FIG. 3. The memory-device-side base address prefix may be used to form the mapped or transformed address 360 in various embodiments: for example, the starting address of a mapped range of addresses of the memory device may be determined by appending zeroes to the memory-device-side base address prefix.

The range of untransformed addresses 350 which are going to be transformed may be indicated via a window size code which occupies bits 28-30 in the depicted example. If bits 28-30 are set to 001, only those untransformed addresses which lie within a window of 256 megabytes from the starting address formed by appending zeroes to the processor-side base address prefix may be mapped. Similarly, if bits 28-30 are set to 010, untransformed addresses within a window of 512 megabytes from the starting address may be mapped, and if bits 28-30 are set to 100, untransformed addresses within a range of a gigabyte from the starting address may be mapped. Untransformed addresses which do not meet the criteria indicated by the combination of the processor-side base address prefix of a given EPR and the window size code of that EPR may not be transformed, even if enable flag of bit 0 is set to 1.

In the depicted embodiment, EPR bits 13-27 and 31 may be reserved (i.e., these bits may not be used for specifying address range expansion parameters). In various embodiments, the number of bits used for the base address prefixes and/or the window size code may differ from those indicated in FIG. 3. Similarly, the particular bit positions used for the different parameters may differ from those shown in FIG. 3. In embodiments in which multiple EPRs 314 are employed, it may be the case that the untransformed and/or transformed address ranges indicated in two EPRs overlap or conflict. Any of several different approaches may be taken in such scenarios as discussed in further detail below—e.g., a priority-based scheme may be used in which the transformed address corresponding to one EPR overrides the transformed address corresponding to other EPRs, or an error signal such as an interrupt may be generated. In scenarios in which multiple EPRs do not conflict with one another, each EPR may be used to map a respective range of processor-side addresses to a corresponding range of memory-device-side addresses.

Figure 4:
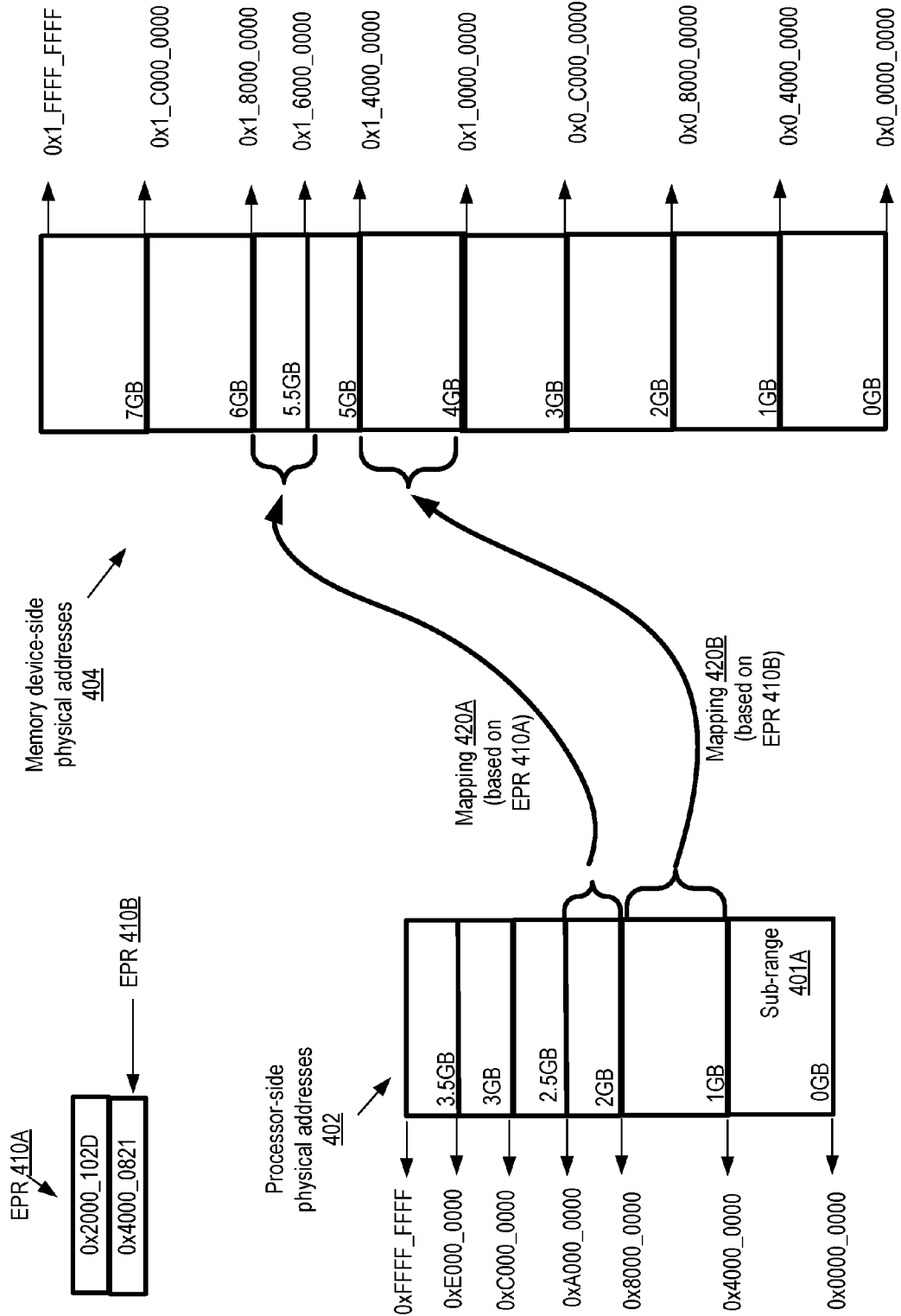
FIG. 4 illustrates an example scenario in which two processor-side address ranges may be transformed by an address range expander, according to at least some embodiments.

FIG. 4 illustrates an example scenario in which two processor-side address ranges may be transformed by an address range expander, according to at least some embodiments. In the depicted scenario, two 32-bit expansion parameter address registers EPR 410A and EPR 410B are utilized, and the parameter specification scheme illustrated in FIG. 3 is employed for each register. The value stored in EPR 410A is 0x2000_102D (expressed in hexadecimal form) and the value stored in EPR 410B is 0x4000_0821. These values may be stored in the registers, for example, by low-level software and/or firmware modules in various embodiments. As mentioned earlier, in some embodiments, the expansion parameter registers may form part of a non-cacheable sub-range of addresses. In at least one embodiment, the EPRs may be accessed using a different set of buses than are used for accessing the physical memory device with respect to which address range expansion is being implemented.

Processor-side physical addresses 402 lie within the four-gigabyte range 0-0xFFFF_FFFF in the depicted example, while the example memory-device-side addresses 404 shown in FIG. 4 lie in a range 0-0x1_FFFF_FFFF, which is twice the size of the processor-side physical address range. The bit-sequences corresponding to the parameters indicated within the EPRs are as follows:

EPR 410A: (0x2000_102D or 0010 0000 0000 0000 0001 0000 0010 1101)
    (Bit 0): 1 (address transformation is enabled)
    (Bits 1-8): 0001 0110 or 0x0_16 (memory-device-side base address prefix)
    (Bits 9-12): 1000 or 0x8 (processor-side base address prefix)
    (Bits 28-30): 010 (window size of 512 MB)
EPR 410B: (0x4000_0821 or 0100 0000 0000 0000 0000 1000 0010 0001)
    (Bit 0): 1 (address transformation is enabled)
    (Bits 1-8): 0001 0000 or 0x0_10 (memory-device-side base address prefix)
    (Bits 9-12): 0100 or 0x4 (processor-side base address prefix)
    (Bits 28-30): 100 (window size of 1 GB)

As indicated by the respective bit 0 values, address translation is enabled with respect to both EPRs in the depicted example. The range of processor-side addresses to be mapped comprises 0x8000_0000 through 0x9FFF_FFFF in the case of EPR 410A (a 512 megabyte window starting from the address formed by appending zeroes to the processor-side base address prefix of 0x8). It is noted that in FIG. 4, the addresses forming the upper limits of the mapped ranges are not shown explicitly to avoid clutter—instead, addresses at 512 megabyte intervals or gigabyte intervals are shown within the memory ranges of the processor and the memory device side. Thus, instead of showing 0x9FFF_FFFF, the address of the next byte (0xA000_0000) is shown.

With respect to EPR 410B, the range of processor-side address to be mapped comprises 0x4000_0000 through 0x7FFF_FFFF (a one gigabyte window starting from the address formed by appending zeroes to the processor-side base address prefix of 0x4). As such, the processor-side address ranges indicated in the two EPRs 410 do not overlap.

The memory-device-side window indicated by EPR 410A comprises addresses 0x1_6000_0000 through 0x1_7FFF_FFFF, while the memory-device-side window indicated in EPR 410B comprises 0x1_1000_0000 through 0x1_3FFF_FFFF. The memory-device-side windows also do not overlap. Since neither the processor-side (to-be-mapped) address ranges nor the memory-device-side (mapping result) address ranges overlap or clash with each other, mappings 420A and 420B may both be applied in the depicted embodiment. Of course, for a given untransformed address indicated on a processor's address bus, at most one of the mappings would be applied, depending on whether the untransformed address lies within EPR 410's processor-side address range, within EPR 410B's processor-side address range or in neither processor-side address range.

Figure 5:
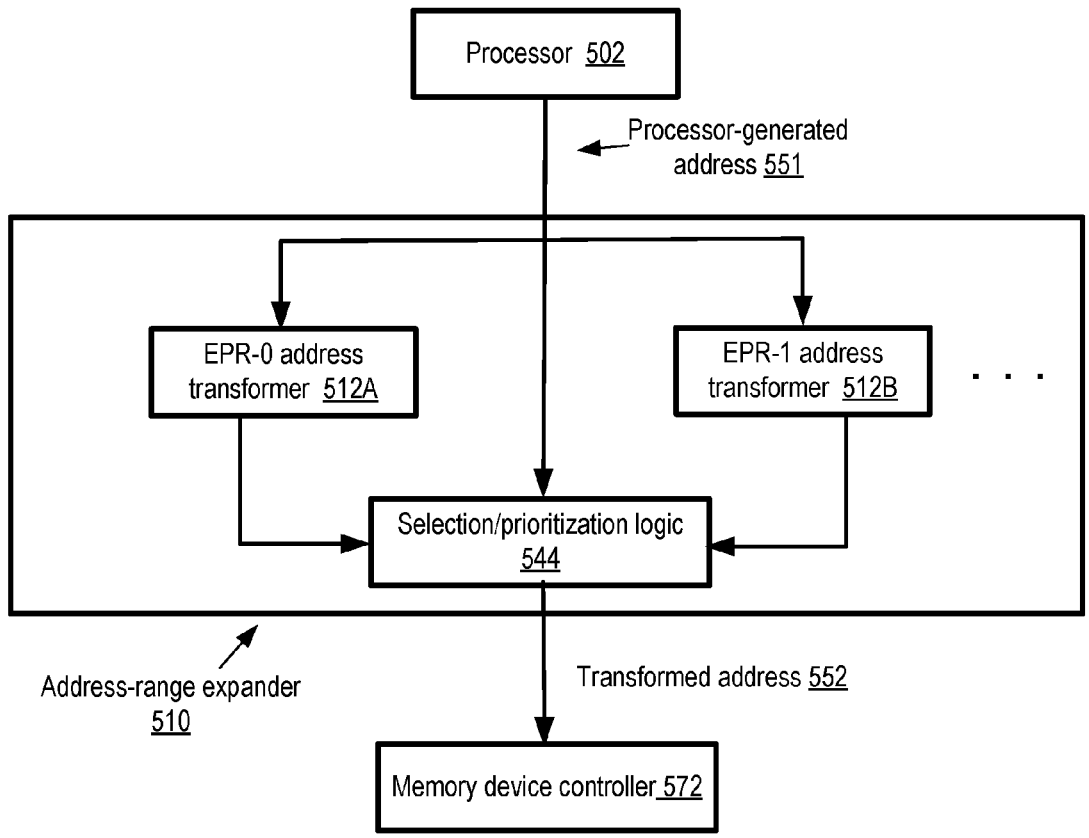
FIG. 5 illustrates an example implementation of an address range expander in which output from one of several address transformers may be selected to generate a transformed address, according to at least some embodiments.

FIG. 5 illustrates an example implementation of an address range expander in which output from one of several address transformers may be selected to generate a transformed address, according to at least some embodiments. In the depicted embodiment, address range expander 510 may comprise two address transformers 512A and 512B. Each address transformer 512 may be configured to implement the transformations indicated in a respective EPR—e.g., EPR-0 in the case of transformer 512A and EPR-1 in the case of transformer 512B. The address range expander 510 may also comprise circuitry to implement selection/prioritization logic 544. The selection/prioritization logic may be responsible for determining, with respect to a given untransformed processor-generated address 551 indicated on the address bus, whether the output of address transformer 512A should be used to form at least a portion of the transformed address 552 to be transmitted to the memory device controller 572, whether the output of address transformer 512B should be used, or whether the untransformed address 551 emitted by the processor 502 should be passed on to the memory device controller 572 without modification.

If neither address transformer 512A nor address transformer 512B is enabled (e.g., if the enable bit is set to zero in both EPR-0 and EPR-1), the untransformed address may be passed on to the memory device controller 572 without modification. If exactly one of the EPRs has its enable bit set, and the untransformed processor-generated address 551 lies within the processor-side address range or window indicated by the parameters of that EPR, then the transformed address 552 may be generated based on the output of the address transformer corresponding to that EPR.

If both EPRs EPR-0 and EPR-1 are enabled, the actions taken at the selection/prioritization logic may differ in the depicted embodiment based on whether there is a conflict or overlap between the address ranges of the EPRs (either the processor-side address ranges, or the memory-device-side address ranges). If there is no conflict in the address ranges, and the untransformed address lies within the address range of one of the EPRs, the output of the address transformer for that EPR may be used to form the transformed address. If there is a conflict in the address ranges, a respective priority setting associated with the EPRs may be used in the depicted embodiment to select the particular EPR whose output should be used to form the transformed address. Such priorities may be assigned statically in at least one embodiment: for example, EPR -0 may be given a higher priority than EPR-1. In the latter scenario, in the event of a clash in parameters, the output produced by the address transformer 512A associated with EPR-0 may override or supersede the output produced by address transformer 512B. In one embodiment, the priorities of the different EPRs may be modified dynamically—e.g., a priority encoding may be included within each EPR, or a different register may be used to indicate the relative priorities of the EPRs. In some embodiments, as described in the context of FIG. 7, a different approach may be taken if the parameters of different EPRs conflict—e.g., an error signal or interrupt may be generated in the event of a conflict. In some embodiments, the approach outlined in FIG. 5, of associating a separate address transformer 512 for each EPR and selecting from among the outputs of the different address transformers, may not be implemented. Instead, for example, a single more complex address transformer may examine the contents of all the different EPRs as well as the untransformed address and generate the appropriate memory-device-side address.

Figure 6:
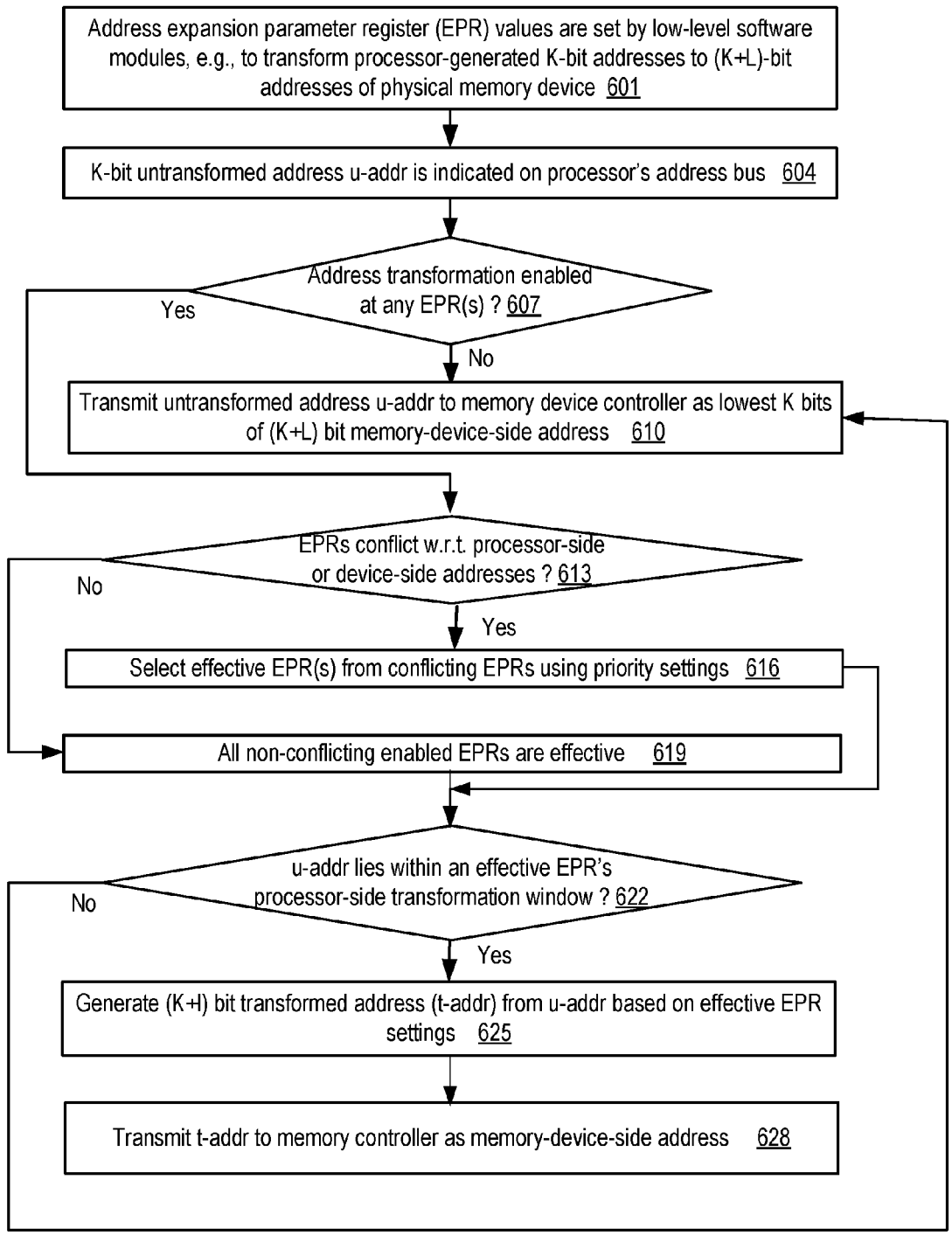
FIG. 6 is a flow diagram illustrating aspects of operations which may be performed to expand the address range of a processor in an environment in which respective priorities may be assigned to respective address transformers, according to at least some embodiments.

FIG. 6 is a flow diagram illustrating aspects of operations which may be performed to expand the address range of a processor in an environment in which respective priorities may be assigned to respective address transformers, according to at least some embodiments. As shown in element 601, a set of expansion parameter registers (EPRs) accessible from an address range expander may be populated with values by a low-level software module, e.g., based on the memory requirements of one or more applications. The register values may be chosen to enable mappings of respective processor-side address ranges (e.g., comprising K bits) to memory-device-side address ranges (e.g., comprising K+L bits) using parameter specification schemes similar to those indicated in FIG. 3. For example, the registers may be set such that addresses emitted by a processor on a 32-bit address bus may be transformed to 36-bit, 40-bit or 64-bit memory-device-side address ranges in some embodiments. Expansion parameter registers with any of a variety of bit-widths (e.g., 16-bits, 32-bits or 64-bits) may be employed in different embodiments.

An untransformed or original address u-addr comprising K bits may be indicated on the processor's address bus (element 604). The address range expander may determine, based on the contents of particular enable bits or bit ranges (such as bit 0), whether address transformation is enabled at any of the EPRs. If address transformation is not enabled at any of the EPRs (as detected in element 607), the processor-generated address u-addr may be transmitted to a physical memory device controller without modification—e.g., as the low-order K bits of a K+L bit address with the bits in positions K+1, K+2, etc. set to zero (element 610).

If at least one EPR is enabled for address transformation (as also detected in element 607), a determination may be made as to whether any of the address ranges indicated in the EPRs conflict with respect to each other. A conflict may be detected, for example, between two EPRs which are both enabled, and which overlap in either their processor-side address ranges or their memory-device-side address ranges. If a conflict is identified (element 613), one of the EPRs may be selected as the "effective" EPR (i.e., the EPR whose parameters are to override or supersede the other conflicting EPR(s)) based on a priority setting in the depicted embodiment (element 616). For example, individual ones of the EPRs may be assigned respective distinct priorities in the depicted embodiment, and the highest-priority EPR among a group of conflicting EPRs may be selected as the effective EPR.

If no conflicts are identified (as may also be determined in operations corresponding to element 613), all the non-conflicting enabled EPRs may be deemed effective (element 619) in the depicted embodiment. (It is noted that in some embodiments, only a single EPR may be used, in which case the question of detecting conflicts among EPRs may not arise, and that single EPR may be considered the effective EPR if it is enabled). The address range expander may determine whether the untransformed address u-addr lies within the processor-side transformation window (element 622). If u-addr lies within the window, a K+L bit transformed address t-addr may be generated from the u-addr based on the memory-device-side base address indicated in the EPR whose processor-side transformation window matched u-addr (element 625). The transformed address t-addr may then be transmitted to a memory-device-side subcomponent, such as a memory device controller, to initiate operations associated with the address indicated by t-addr (element 628). In some embodiments, as discussed above in the context of FIG. 5, each EPR may have an associated address transformer which generates some number of output bits which are to form part or all of the transformed address t-addr, and the output of the address transformer which corresponds to the effective address transformer may be selected to determine t-addr.

If u-addr does not fall within the processor-side transformation window of an effective EPR, as also detected in element 622, in the depicted embodiment the effect would be the same as though address transformation is not enabled at any EPR. That is, u-addr may be transmitted, unchanged, as the low bits of the K+L bit address (element 610).

Figure 7:
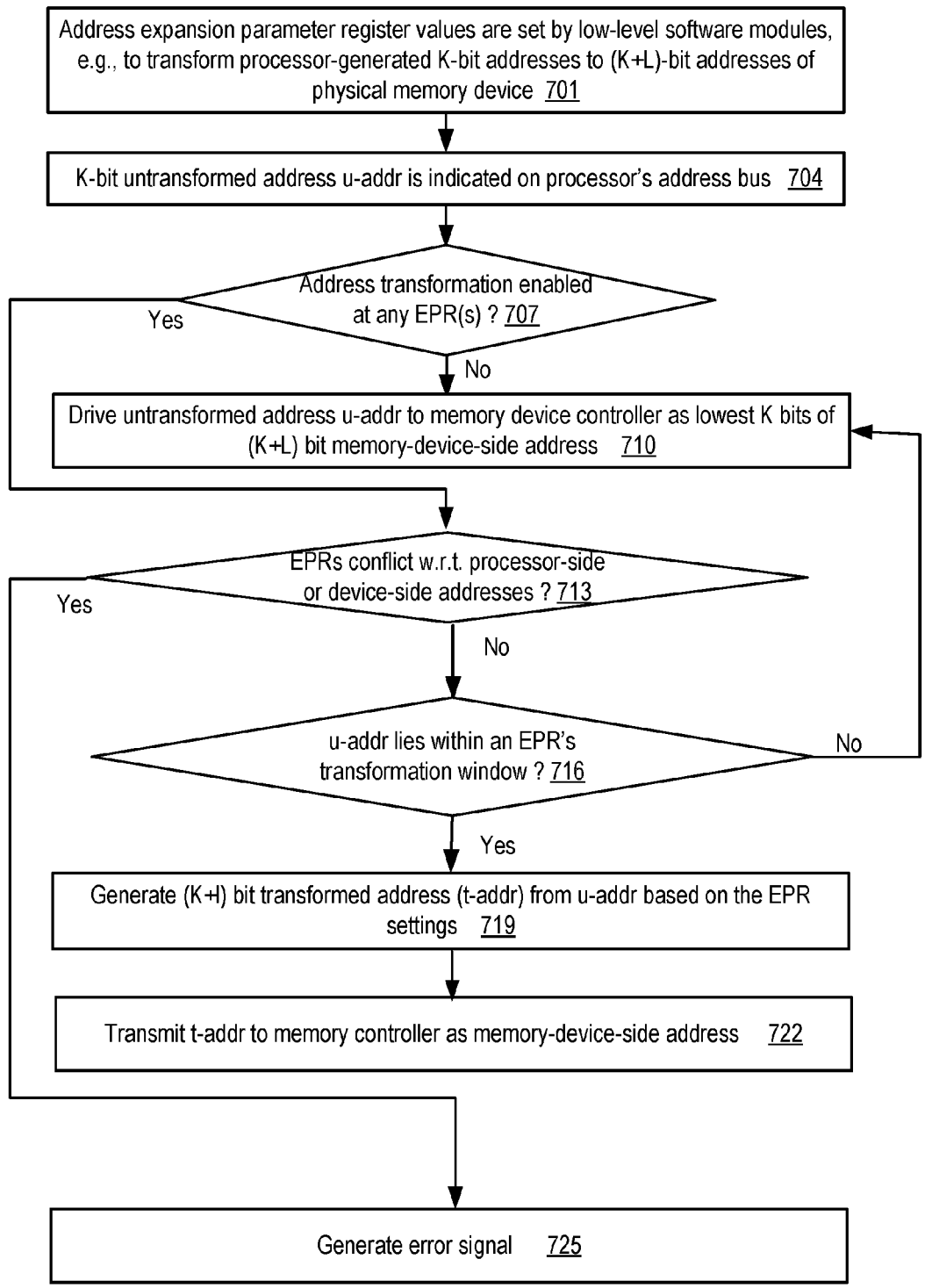
FIG. 7 is a flow diagram illustrating aspects of operations which may be performed to expand the address range of a processor in an environment in which an error signal may be generated in the event of a conflict between expansion parameters, according to at least some embodiments.

FIG. 7 is a flow diagram illustrating aspects of operations which may be performed to expand the address range of a processor in an environment in which an error signal may be generated in the event of a conflict between expansion parameters, according to at least some embodiments. The main difference between the operations indicated in FIG. 7 and those indicated in FIG. 6 is the manner in which conflicting address expansion parameters are handled. As in FIG. 6, respective sets of expansion parameters may be stored within several expansion parameter registers (element 701) accessible from an address range expander, intended to enable access to a larger address range (e.g., addresses expressible using K+L bits) than can be addressed natively by internal subcomponents of the processor itself (e.g. the processor may have been designed with a K-bit address range). When an untransformed address u-addr comprising K bits is indicated on the processor's address bus (element 704), the address range expander may determine whether address transformation is enabled at any of the EPRs. If address transformation is not enabled at any of the EPRs (as detected in element 707), the processor-generated address u-addr may be transmitted to a physical memory device controller without modification (element 710).

Figure 8A:
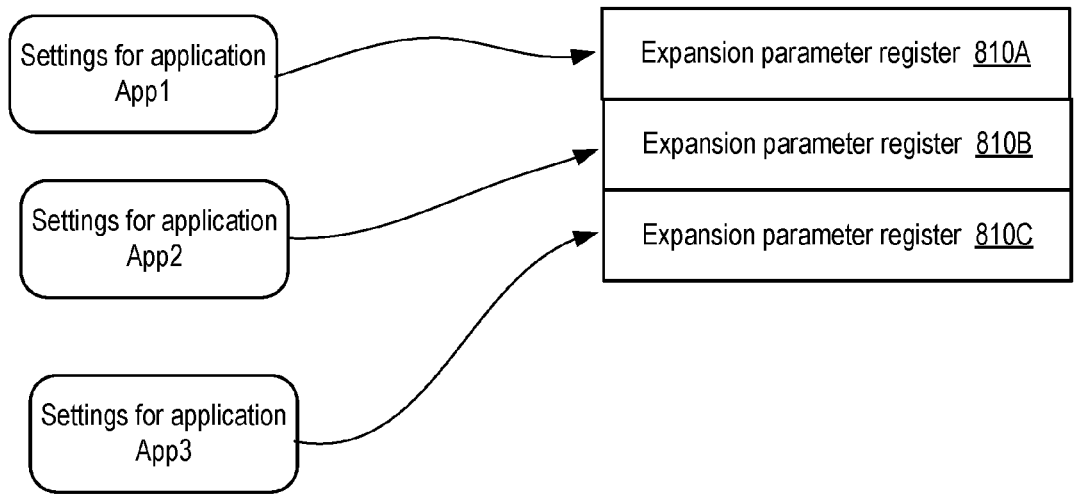
FIG. 8a and FIG. 8b illustrate respective examples of the manner in which multiple expansion parameter registers may be utilized by different applications, according to at least some embodiments.
Figure 8B:
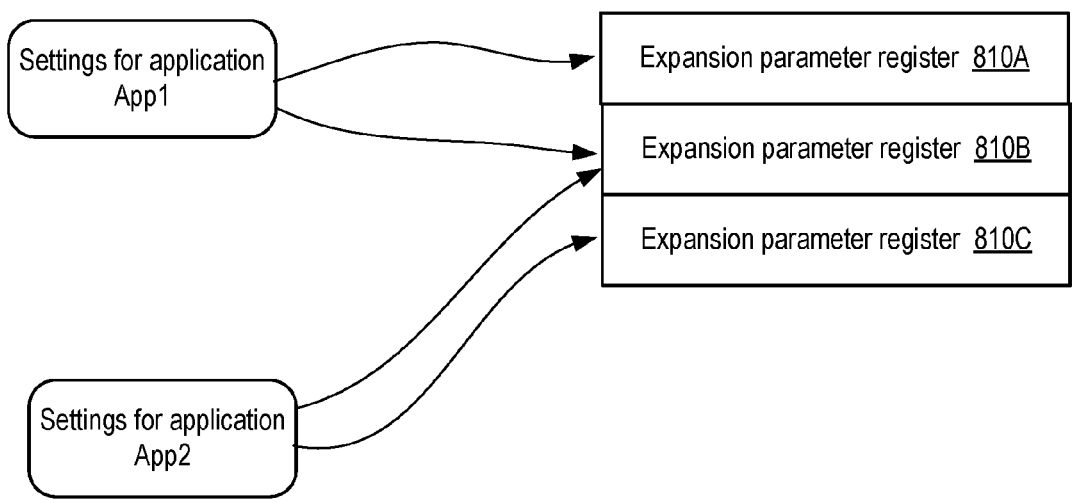

If at least one EPR is enabled for address transformation (as also detected in element 707), a determination may be made as to whether any of the address ranges indicated in the EPRs conflict with respect to each other. As in FIG. 6, a conflict may be detected between two EPRs if they are both enabled, and either their processor-side address ranges or their memory-device-side address ranges (or both ranges) overlap. If such a conflict is identified (as detected in element 713), an error signal or interrupt may be generated (element 725), and address transformation may not be performed. If no conflict is detected, and if u-addr is within the processor-side address range of one of the EPRs (as detected in element 716) a transformed address (t-addr) may be generated using that EPR (element 719). That address may be transmitted to a controller of the physical memory device to perform an operation (e.g., a read or a write) associated with t-addr (element 728). In some embodiments, the error signal or interrupt may be generated at the time that an attempt to store a conflicting set of parameters at an expansion parameter register (with respect to any other EPR into which parameters have already been stored) is made, instead of at the time that an address is being evaluated for possible transformation as indicated in FIG. 7. It is noted that in various embodiments, at least some operations other than those illustrated in the flow diagrams of FIG. 6 and FIG. 7 may be used to implement the address range expansion techniques described above. Some of the operations shown may not be implemented in some embodiments or may be implemented in a different order, or in parallel rather than sequentially If the execution environment in which an address range expander is being used comprises multiple applications which are permitted to modify expansion parameter registers, the possibility of conflicts between the applications with respect to address transformations may arise. FIG. 8*a* and FIG. 8*b* illustrate respective examples of the manner in which multiple expansion parameter registers may be utilized by different applications, according to at least some embodiments. It is noted that as used, herein, the term "application" may refer to software or firmware modules running at any level within an execution stack—e.g., at a low-level driver, within an operating system kernel, or within user space.

In FIG. 8*a*, three applications App1, App2 and App3 are run in an execution environment in which at least three expansion parameter registers 810A, 810B and 810C are implemented for the processor(s), and each of the three applications may be intended to make use of the address range expansion feature. The expanded address ranges to be used by each application may be indicated by the parameters stored in respective EPRs 810, with each application being restricted to an EPR which is not used by any other application. Thus, EPR 810A may be used for App1, EPR 810B may be used for App2, and EPR 810C may be used for App3. This approach, in which there is no overlap between the set of registers used for different applications, may be referred to as "segregated register mode". The manner in which this application-level segregation is enforced may vary in different embodiments. For example, in some embodiments, the address range expander may be implemented at a special-purpose SOC intended to run only a limited set of applications (e.g., one or more database applications or machine learning applications optimized specifically for the SOC), and the designers of the applications may be required to comply with the requirement of utilizing non-overlapping sets of EPRs. It is noted that although each application is shown as utilizing a single EPR 810 in FIG. 8*a*, it may be the case that a given application may use multiple EPRs even in segregated register mode—e.g., App1 may use EPRs 810A and 810B, App2 may use EPR 810C, and so on.

In a second approach towards EPR use illustrated in FIG. 8*b*, such segregation may not be required. Instead, any application may utilize any combination of the expansion parameter registers 810A, 810B or 810C. As shown, App1 may utilize EPRs 810A and 810B, while App2 utilize EPRs 810B and 810C. In the shared-register mode shown in FIG. 8*b*, the responsibility for ensuring that the correct parameters (from the application's perspective) are loaded into the appropriate EPRs when needed may be left to the application designers. For example, when a context switch occurs and a different application is granted access to the processor, the parameters needed for that application may have to be stored in the EPRs being used.

Figure 9:
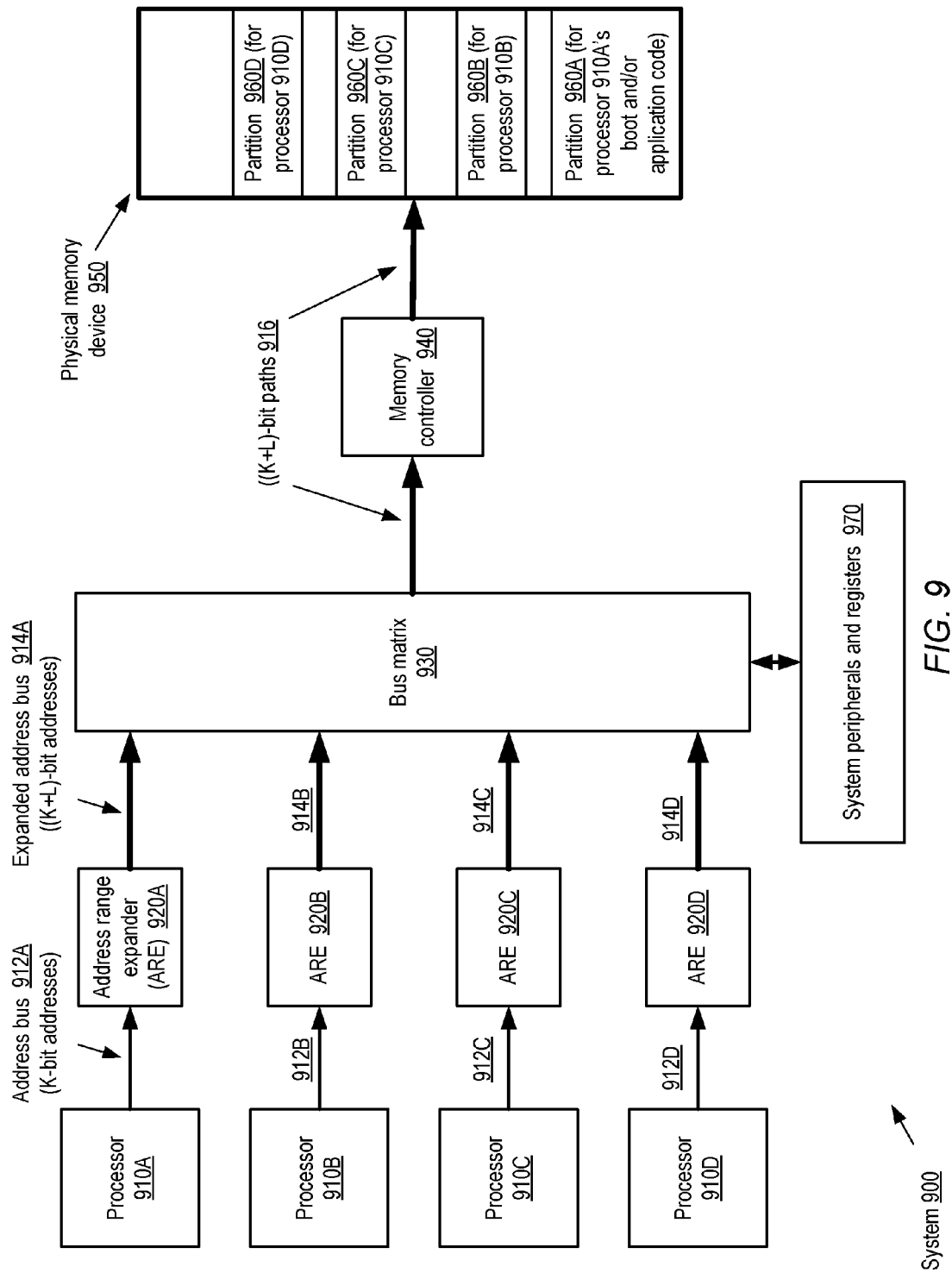
FIG. 9 illustrates an example system environment in which respective address range expanders may be used for several processors, enabling different processors to access respective partitions of a physical memory device using the same processor-side address, according to at least some embodiments.

As mentioned earlier in the context of FIG. 2, in some embodiments several address range expanders may be implemented, e.g., one expander for each of a plurality of processors. FIG. 9 illustrates an example system environment in which respective address range expanders may be used for several processors, enabling different processors to access respective partitions of a physical memory device using the same processor-side address, according to at least some embodiments. As shown, system 900 includes a plurality of processors 910A-910D and a corresponding plurality of address range expanders (AREs) 920A-920D (with ARE 920A designated for processor 910A, ARE 920B for processor 910B, etc.). System 900 may also include a physical memory device 950 with an associated memory controller 940. The AREs 920 may be linked to the memory controller 940 via a bus matrix 930 (to which system peripherals and registers 970 may also be linked). In at least some implementations, all of the components shown in FIG. 9 may be incorporated within a single chip; in other implementations, multiple chips may be used. The physical memory device 950 may have a larger address range (e.g., an address range expressed in (K+L) bits) than the address ranges of the processors (e.g., each expressed in K bits). K-bit addresses on the address buses 912 (e.g., 912A-912D) of the processors may be transformed into (K+L)-bit addresses by the AREs, e.g., using parameters indicated in expansion parameter registers as discussed earlier. The expanded addresses may be transmitted by the AREs to the memory controller and memory device 950 via (K+L)-bit buses 914A-914D, the bus matrix 930 and paths 916.

Consider an example scenario in which K is 32 and L is 4. That is, at least some 32-bit addresses output by processors 910 are transformed to 36-bit addresses of the physical memory device 950. The physical memory device 950 may be partitioned such that each processor 910 has its own dedicated partition(s) (such as partitions 960A-960D for processors 910A-910D respectively). In some embodiments, each partition 960 may be the same size (e.g., three gigabytes or four gigabytes), while in other embodiments the partitions may have different sizes. Each partition 960 may be used to house the corresponding processor's unique boot and/or application code. This code may be loaded into the memory device 950 by a separate management processor in some embodiments. Alternatively, in one embodiment the code could be loaded to the memory partitions from an external storage device as part of the boot process of the first processor which boots among the set of processors 910A-910D. Once this first processor has booted, it may reset the other processors, allowing them to boot.

The arrangement shown in FIG. 9 may be especially useful in scenarios in which each processor 910 typically boots from the same processor-side address (e.g., the processor-side address 0x0). If an address range expansion technique similar to that shown in FIG. 9 were not supported, all of the processors 910 may have to use the same boot image at memory address 0x0. This may cause a performance bottleneck, and may tend to make the boot firmware more complicated since the firmware may have to track which particular processor is performing the memory accesses at any given time. If the approach illustrated in FIG. 9 is employed, in contrast, a respective ARE 920 could be configured to translate the corresponding processor's untransformed boot code address 0x0 to a dedicated location in the processor's partition 960. This would allow each processor to have a unique boot image and a dedicated region of physical memory device 950. A common untransformed boot code address such as 0x0 (or any other address within the processor-side boot code address range), when emitted by different processors, may be transformed to different memory-device-side boot code addresses by the respective AREs. The memory controller 940 may be able to manage the memory traffic more easily (as compared to the case in which per-processor ARE's are not used) as each processor would access its respective partition. This may also enable simplification of the boot code for the various processors, as the problems associated with sharing the same memory region when booting different processors may not arise.

It is noted that with respect to the techniques for address range expansion discussed above, various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more processors, including a first processor;
a physical memory device; and
one or more address range expanders, including a first address range expander,
wherein:
the first address range expander is coupled to the first processor and the physical memory device and comprises one or more address transformers;
individual ones of the one or more address transformers correspond to respective expansion parameter registers of one or more expansion parameter registers; and
a set of one or more bits of a first expansion parameter register of the one or more expansion parameter registers indicates a memory-device-side base address prefix;
wherein the first address range expander is configured to:
determine that address transformation has been enabled with respect to an untransformed address indicated on an address bus of the first processor, wherein the untransformed address comprises a first number of bits corresponding to an address range of the first processor;
generate, using a particular address transformer of the one or more address transformers, a transformed address based at least in part on the memory-device-side base address prefix and an offset indicated in the untransformed address, wherein the transformed address lies within an address range of the physical memory device, wherein the address range of the physical memory device exceeds the address range of the first processor;
transmit the transformed address to a controller of the physical memory device to initiate an operation associated with the transformed address.

2. The system as recited in claim 1, wherein a particular set of one or more bits of a first expansion parameter register of the one or more expansion parameter registers indicates a processor-side base address prefix, wherein the particular address transformer is configured to:
verify that a prefix of the untransformed address matches the processor-side base address prefix.

3. The system as recited in claim 1, wherein a particular set of one or more bits of a first expansion parameter register of the one or more expansion parameter registers indicates a memory window size, wherein the particular address transformer is configured to:
  verify that the untransformed address lies within a range of addresses corresponding to the memory window size.

4. The system as recited in claim 1, wherein the one or more address transformers comprise a second address transformer, wherein to select the output generated by the particular address transformer, the first address range expander is configured to:
  determine, based at least in part on a priority associated with the particular address transformer, that output produced by the particular address transformer overrides output produced by the second address transformer.

5. The system as recited in claim 1, wherein the physical memory device comprises one of: (a) a dynamic random access memory device or (b) a static random access memory device.

6. The system as recited in claim 1, further comprising a first data bus coupled to the first processor and the physical memory device and a second data bus coupled to the first processor and the one or more expansion parameter registers.

7. The system as recited in claim 1, wherein the one or more processors comprise a second processor, wherein the one or more address range expanders comprise a second address range expander, wherein the physical memory device comprises (a) a first partition storing a first collection of boot code for the first processor and (b) a second partition storing a second collection of boot code for the second processor, wherein the first address range expander is configured to:
  generate a first transformed boot code address, based at least in part on a first untransformed boot code address indicated on the address bus of the first processor, wherein the first transformed boot code address is part of the first partition; and
  transmit the first transformed boot code address to the controller of the physical memory device to initiate an operation associated with the first transformed boot code address; and
and wherein the second address range expander is configured to:
  generate a second transformed boot code address, based at least in part on a second untransformed boot code address indicated on an address bus of the second processor, wherein the second transformed boot code address is part of the second partition; and
  transmit the second transformed boot code address to the controller of the physical memory device to initiate an operation associated with the second transformed boot code address.

8. A method, comprising:
  determining, at an address range expander circuit coupled to a processor's address bus that address transformation has been enabled with respect to an untransformed address indicated on the address bus, wherein:
    the address range expander circuit is external to the processor;
    the address range expander circuit comprises one or more address transformers;
    individual ones of the one or more address transformers correspond to respective expansion parameter registers accessible from the processor;
    a set of one or more bits of a first expansion parameter register of the respective expansion parameter registers indicates a memory-device-side base address prefix; and
    the untransformed address comprises a first number of bits corresponding to an address range of the processor;
  selecting, at the address expander circuit, a particular address transformer of the one or more address transformers;
  generating, by the particular address transformer, a transformed address based at least in part on the memory-device-side base address prefix and an offset indicated in the untransformed address, wherein the transformed address lies within an address range of a physical memory device, wherein the address range of the physical memory device exceeds the address range of the processor;
  transmitting, by the address range expander circuit, the transformed address to a memory controller of the physical memory device to initiate an operation on data stored at the transformed address.

9. The method as recited in claim 8, wherein a particular set of one or more bits of a first expansion parameter register of the respective expansion parameter registers indicates a processor-side base address prefix, further comprising:
  prior to generating the output, verifying, by the particular address transformer, that the untransformed address comprises the processor-side base address prefix.

10. The method as recited in claim 8, wherein a particular set of one or more bits of a first expansion parameter register of the respective expansion parameter registers indicates a memory window size, further comprising:
  prior to generating the output, verifying, by the particular address transformer, that the untransformed address lies within a range of addresses corresponding to the memory window size.

11. The method as recited in claim 8, wherein a particular set of one or more bits of a first expansion parameter register of the respective expansion parameter registers indicates that address transformation is enabled with respect to untransformed addresses matching one or more other parameters indicated in the first expansion parameter registers.

12. The method as recited in claim 8, further comprising:
  issuing, by the address range expander circuit, an error signal indicating that an address range indicated in a first expansion parameter register overlaps with an address range indicated in a second expansion parameter register.

13. An address range expander circuit, comprising:
  a processor-side interface configured to couple to a processor;
  a memory-device-side interface configured to couple to a physical memory device; and
  one or more address transformers, including a first address transformer;
  wherein the first address transformer is configured to;
    determine that address transformation has been enabled with respect to an untransformed address indicated at the processor-side interface, wherein the untransformed address comprises a first number of bits corresponding to an address range of the processor;
    generate a transformed address based at least in part on a first memory-device-side base address prefix indicated in a particular set of one or more bits of a first expansion parameter register and an offset indicated in the untransformed address, wherein the transformed address lies within an address range of the physical memory device, wherein the address range of the physical memory device exceeds the address range of the processor;

transmit the transformed address to the physical memory device via the memory-device-side interface to initiate an operation associated with the transformed address.

14. The address range expander circuit as recited in claim 13, wherein to generate the first transformed address, the first address transformer is configured to:

verify that a prefix of the untransformed address matches a processor-side base address prefix indicated in a particular set of one or more bits of a first expansion parameter register.

15. The address range expander circuit as recited in claim 13, wherein to generate the transformed address, wherein the first address transformer is configured to:

verify that the untransformed address lies within a range of addresses corresponding to a memory window size indicated in a particular set of one or more bits of a first expansion parameter register.

* * * * *

UNITED STATES PATENT AND TRADEMARK OFFICE
CERTIFICATE OF CORRECTION

PATENT NO. : 9,990,282 B2
APPLICATION NO. : 15/140333
DATED : June 5, 2018
INVENTOR(S) : Wright et al.

Page 1 of 1

It is certified that error appears in the above-identified patent and that said Letters Patent is hereby corrected as shown below:

In the Specification

In Column 10, Line 1, delete "EPR -0" and insert -- EPR-0 --, therefor.

In Column 12, Line 17, after "sequentially" insert -- . --.

In Column 13, Line 35, delete "4 ." and insert -- 4. --, therefor.

In the Claims

In Column 15, Line 45, in Claim 7, delete "and wherein" and insert -- wherein --, therefor.

In Column 16, Line 30, in Claim 10, delete "claim 8 ," and insert -- claim 8, --, therefor.

Signed and Sealed this
Twenty-ninth Day of January, 2019

Andrei Iancu
*Director of the United States Patent and Trademark Office*